Dec. 29, 1964   H. SCHMIDT   3,163,477
SELF CONTAINED CAGE FOR RETAINING BEARING ROLLERS
Filed May 2, 1962   3 Sheets-Sheet 1

INVENTOR.
HEINRICH SCHMIDT
BY

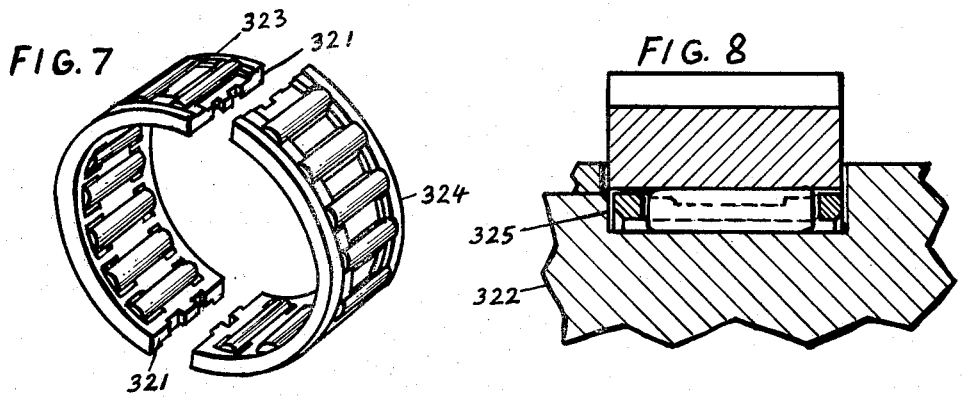
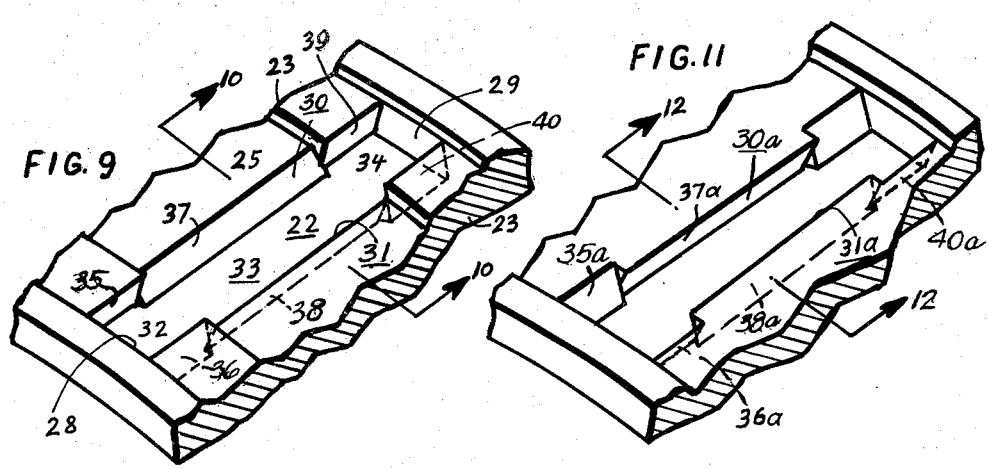
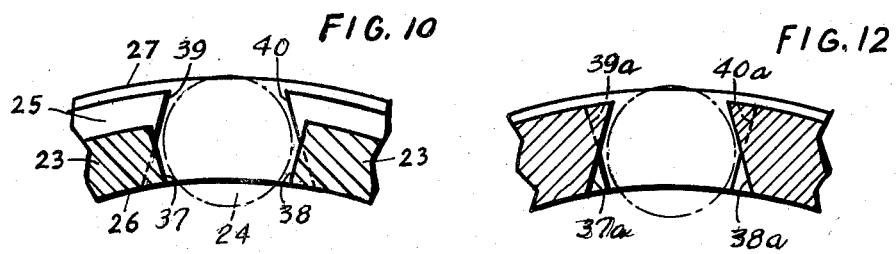
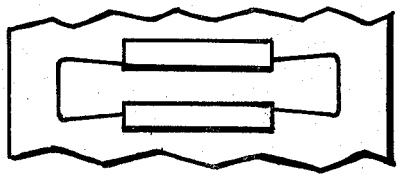

Dec. 29, 1964        H. SCHMIDT        3,163,477

SELF CONTAINED CAGE FOR RETAINING BEARING ROLLERS

Filed May 2, 1962        3 Sheets-Sheet 3

INVENTOR.
HEINRICH SCHMIDT
BY

United States Patent Office 3,163,477
Patented Dec. 29, 1964

3,163,477
SELF CONTAINED CAGE FOR RETAINING
BEARING ROLLERS
Heinrich Schmidt, Levittown, Pa., assignor to Roller
Bearing Company of America, Trenton, N.J., a corporation of New Jersey
Filed May 2, 1962, Ser. No. 191,828
12 Claims. (Cl. 308—217)

This invention relates to an improved type of self contained roller bearing cage having crossbars spacing axially parallel roller receiving windows. My improved cage prevents drop out of the freely rotatable rollers from the windows by the use of radially inclined, sectionalized walls forming the sides of the windows and of the crossbars. The improved cage is of one piece construction having cylindrical end rims and is used primarily in connection with rollers having diameters less than their lengths.

It is an object of this invention to provide a cage having windows with sectionalized wall structures which prevent the free passage of the rollers into and out of the windows of the cage past the inner and outer peripheries of the cage while permitting the free rotation of the rollers in the windows and pockets.

It is a further object of this invention to provide spaced retaining and guiding walls wholly within the annular cage surfaces, that is to say, no part of the retention means protrudes past the inner or outer peripheries of the cage.

It is a further object of this invention to provide a self contained roller cage which can be used without retaining inner or outer races.

I may use my improved cage in connection with two or more rollers in one window or with two or more rows of rollers with spacing ribs between the rows of rollers. Also, I may split my cage in two along a diametrical plane so that each half contains one half of the total number of rollers in the original cage, such halves being interlocking or not as desired.

It is common to provide roller bearings with either inner or outer races, or both, and to use one or more of such races to prevent the escape of rollers from the cage windows. Where one race only is used in connection with the cage, the bars spacing the windows are generally rolled, swaged, staked or coigned to provide some type of protuberance extending out from the bar to prevent the escape of the roller from the cage window on the side of the cage away from the race. This invention eliminates any dependency on races or staking, swaging, coigning and similar means to prevent drop out of the rollers form the windows.

The side walls of the improved windows provided by the present invention are formed entirely between the inner and outer annular surfaces of the cage. The geometrical relationship between different parts or sections of the same side wall, in cooperation with the opposed side wall, is such that the wall sections prevent the free passage of the roller from the cage windows unless a force is applied to spring the roller past the retaining wall sections. If force is applied, the retaining walls are flexed to permit the passage of the roller into, or out of, the window.

In accordance with this invention, the individual windows are sub-divided into pockets each of which is partly defined by a wall section. Preferably, each side wall of a window is sectioned but retention of a roller in a window is possible where but one side wall is sectioned. In either case, adjacent wall sections on one side of a window are formed so as to be inclined with respect to each other. If both side walls of a window are sectioned, the opposing wall sections may be inclined or parallel to each other provided they are inclined to an axial radial plane of the cage. The angle of inclination between adjacent wall sections is such as to form window openings along the inner and outer peripheries of the cage which prevent the escape of rollers from the cage except under pressure.

The foregoing and other objects of the invention, the principles of the invention, and the best modes in which it is contemplated applying such principles will more fully appear from the following description and accompanying drawings in illustration thereof.

In the drawings,

FIG. 7 is a perspective view of a split roller cage embodying the invention with partition through opposite cross bars with interlocking means;

FIG. 8 is a partial cross-sectional view of an application of the cage of FIG. 7 in connection with a grooved shaft and a gear;

FIG. 9 is an enlarged perspective view of a portion of a groove cage illustrating one roller window with alternate converging and diverging wall sections along both side walls of the window;

FIG. 10 is an enlarged sectional view, taken along line 10—10 of FIG. 9, with roller inserted in the window;

FIG. 11 is an enlarged perspective view of a portion of a cage illustrating one roller window with alternate diverging and converging wall sections, such alternation being reversed to that illustrated in FIG. 9;

FIG. 12 is an enlarged sectional view, taken along line 12—12 of FIG. 11, with roller inserted in the window;

FIG. 13 is an enlarged plan view of a portion of a cage illustrating a window having tapered pockets at the ends thereof;

Figure 1:
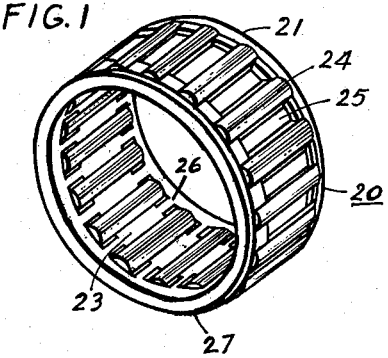
FIG. 1 is a perspective view of a roller bearing cage embodying the invention with all of the rollers inserted in the windows.

Referring to the drawings, the self contained cage 20 has cylindrical end rims 21 and a plurality of axially parallel windows 22 spaced by crossbars 23. Each window 22 is adapted to guide and retain a roller 24 which may be snapped into and out of said windows. As illustrated in FIG. 9, a groove 25 may be cut in the crossbars 23 to lighten the cage and provide a grease retention space. The thickness of the cage is less than the diameter of the rollers 24 so that the rollers project beyond the inner and outer annular surfaces 26, 27 of the rims 21 or project beyond only one of said surfaces (FIG. 10).

Each window 22 of the cage 20 is defined by end walls 28 and 29 and by opposed, elongated side walls 30 and 31. The opposed side walls 30 and 31 are defined, in the form illustrated in FIG. 9, by three contiguous, axially aligned, roller retaining pockets 32, 33, 34 bounded by generally rectangular, inclined wall sections 35, 36, 37, 38, 39 and 40, respectively. The opposed wall sections alternately converge and diverge along the outer periphery of the cage 20 and alternately diverge and converge along the inner periphery of the cage 20. The wall sections 35–36 and 39–40 restrict the free passage of a roller 24 into and from the cage 20 in one radial direction and the wall sections 37–38 restrict the free passage of the roller into and from the cage in the opposite radial direction. Thus, adjacent pairs of wall sections prevent the free passage of a roller 24 from the cage in both inwardly and outwardly radial directions though a roller may be, under pressure, snapped past the wall sections and out of the cage in both radial directions. The end walls 28 and 29 restrict the movement of the rollers 24 axially.

The wall sections 35 and 39 along this side wall 30 are preferably parallel to one another and to the central wall section 38 forming part of the opposite side wall 31. Likewise, the wall sections 36 and 40 along the side wall 31 are preferably parallel to one another and to the central wall section 37 forming part of the opposite side wall 30. The inclination of the wall sections is such that the distance between the outer edges of the wall sections 35 and 36 and wall sections 39 and 40 toward the outer annulus of the cage is less than the diameters of the rollers 24. Conversely, the distances between the peripheral edges of such wall sections along the inner annulus of the cage are greater than the diameters of the rollers 24. As the openings of the central pocket 33, i.e., between wall sections 37 and 38, are in reverse order relative to the end pockets 32 and 34, the central pocket 33 will freely pass a roller 24 toward the outer annulus of the cage but will prevent radial passage of a roller 24 at the inner annulus of the cage, FIG. 10. The groove 25 does not affect the retaining capability of the cage as such groove only removes that part of the wall sections 37 and 38 which would not engage the roller 24.

The wall sections 35a, 36a, 37a, 38a, 39a and 40a of the window and cage illustrated in FIGS. 11 and 12 are oppositely inclined with respect to corresponding sections in FIGS. 9 and 10.

To insert or remove a roller 24 into or from a window 22 it is necessary to apply sufficient radial pressure to the roller or cage bars so as to flex the crossbars 23 and permit the roller to move past the peripheral edges of the converging wall sections.

In the cage illustrated in FIG. 9 the rollers will be more easily inserted into the cages if the rollers are inserted from the inner annular surface of the cage. In the cage illustrated in FIGS. 11 and 12 the rollers are preferably inserted past the outer annular surface of the cage. While free passage of a roller 24 from the cage 20 is prevented by one pair of wall sections in one radial direction and by two pairs of wall sections in the opposite radial direction, the opposed walls do not prevent free rotation of the rollers in the window and pockets, as is apparent in FIGS. 10 and 12.

I may modify my improved cage by making the opposed wall sections parallel with respect to each other rather than inclined, and by varying the number of pockets per window.

Figure 14:
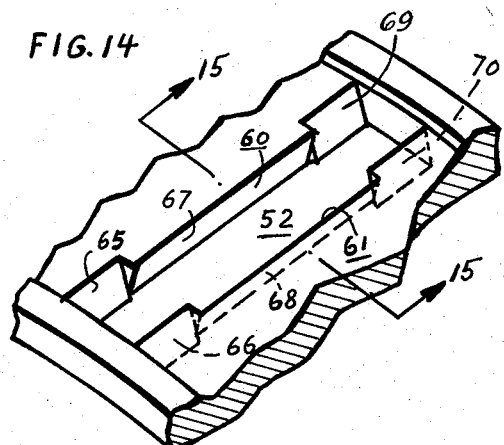
FIG. 14 is an enlarged perspective view of a portion of a cage illustrating one roller window with pockets having opposed, parallel wall sections radially inclined and inclined with respect to the next adjacent wall sections.
Figure 15:
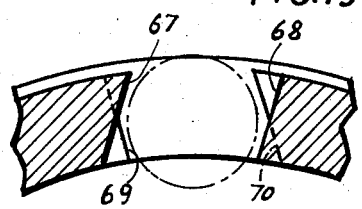
FIG. 15 is an enlarged sectional view taken along line 15—15 of FIG. 14.

FIGS. 14 and 15 illustrate a modified cage window in which the opposed wall sections of the pockets are parallel to each other. Opposed wall sections 65, 66 are parallel to each other; wall sections 67, 68 are parallel to each other; and wall sections 69, 70 are parallel to each other and, preferably, to wall sections 65, 66. Each wall section 65, 67 and 69 is inclined with respect to the next adjacent wall section and to an axial radial plane extending through the window and such wall sections 65, 67, and 69 collectively form the side wall 60 of the window 52. The opposite side wall 61 comprises wall sections 66, 68 and 70 and each such section is inclined with respect to the next adjacent wall section and to an axial radial plane extending through the window.

The minimum clear opening of the window 52 along the outer periphery of the cage is slightly less than the diameter of a roller. That is, the chordal distance between the outer peripheral edges of the wall sections 66 and 67 and between wall sections 70 and 67 is slightly less than the diameter of a roller. Along the inner periphery of the cage the chordal distance between the peripheral edges of the wall sections 65 and 68 and between the peripheral edges of the wall sections 69 and 68 is also slightly less than the diameter of a roller. Thus, the edges of the wall sections retain the roller in the cage window but the roller is freely rotatable in the window, as may be seen in FIG. 15.

Figure 16:
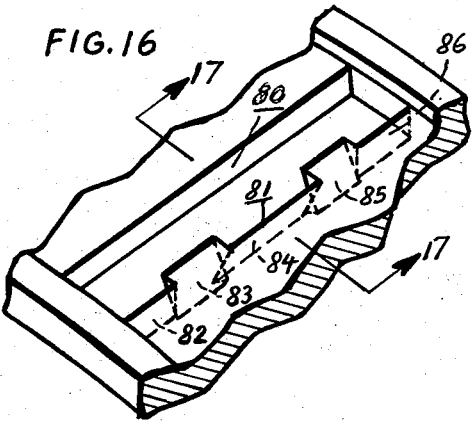
FIG. 16 is an enlarged perspective view of a portion of a cage illustrating one roller window with one sectionalized side wall and one non-sectionalized side wall.
Figure 17:
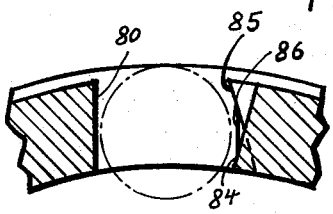
FIG. 17 is an enlarged sectional view taken along line 17—17 of FIG. 16.

FIGS. 16 and 17 illustrate a further modification of my improved cage. In such modification one side wall 80 of the window is not sectioned while the other side wall 81 is divided into five wall sections 82, 83, 84, 85 and 86. Wall sections 83, 84 and 85 are inclined similarly to wall sections 36, 38 and 40 and, in cooperation with opposed side wall 80, restrict the movement of a roller into or out of the window except under pressure. The end wall sections 82 and 86 are parallel to a radial plane extending through the window and provide end guidance for the roller. If desired, the side wall 81 can be restricted to fewer subdivisions such as illustrated by side wall 31 (FIG. 9), side wall 31a (FIG. 11), and side wall 61 (FIG. 14).

Figure 3:
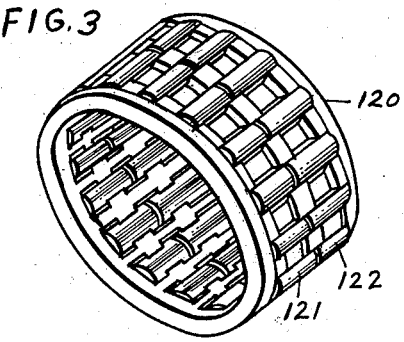
FIG. 3 is a perspective view of a roller cage embodying the invention with two rollers inserted in each window.
Figure 4:
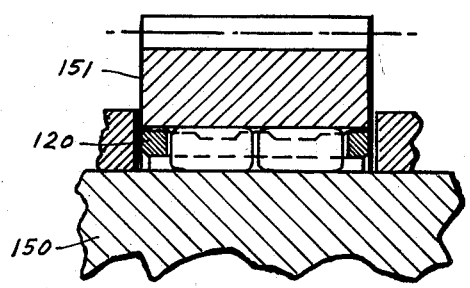
FIG. 4 is a partial cross-sectional view of an application of the cage of FIG. 3 illustrated with a shaft and a gear.
Figure 5:
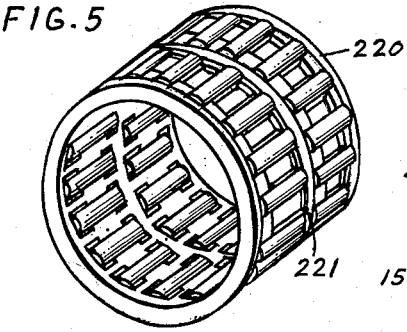
FIG. 5 is a perspective view of a roller cage embodying the invention with two separated rows of rollers.
Figure 6:
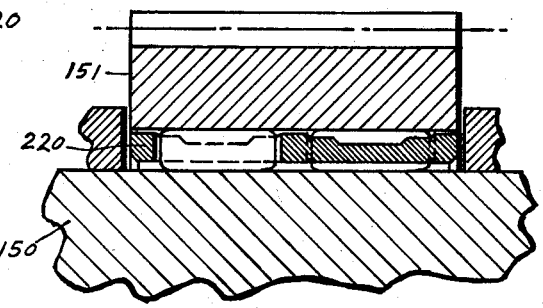
FIG. 6 is a partial cross-sectional view of an application of the cage of FIG. 5 illustrated with a shaft and a gear.
Figure 18:
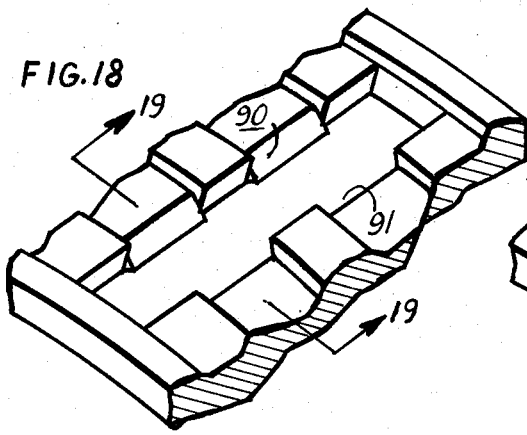
FIG. 18 is an enlarged perspective view of a portion of a cage, similar to the cage shown in FIG. 3, illustrating one roller window with five pockets.
Figure 19:
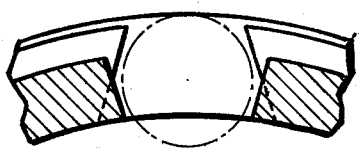
FIG. 19 is an enlarged sectional view taken along line 19—19 of FIG. 18.

FIGS. 18 and 19 illustrate a modification of my improved cage in which the side walls 90 and 91 of a window are each divided into five retaining wall sections alternately converging and diverging with respect to the opposed wall section along the length of the window. Such further sectioning may be useful where two rollers are inserted in a single window (FIG. 3) or where a single roller is used in a relatively long window.

Figure 20:
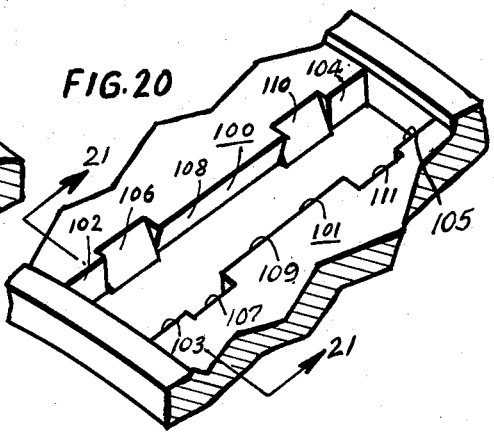
FIG. 20 is an enlarged perspective view of a portion of a cage illustrating one roller window with alternating diverging and converging wall sections along the central portion of the window and radially parallel wall sections at either end of the window.
Figure 21:
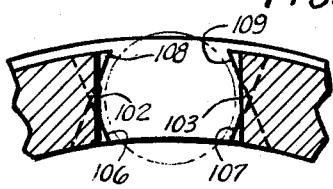
FIG. 21 is an enlarged sectional view taken along 21—21 of FIG. 20.

The modification of my improved cage illustrated in FIGS. 20 and 21 provides five wall sections on each of the side walls 100 and 101. However, end wall sections 102, 103 and 104, 105 are parallel to each other and to a radial plane extending through the window and provide end guidance for the roller. As illustrated, the central wall sections 106, 107; 108, 109; and 110, 111 alternately diverge and converge along the outer periphery of the cage to retain the roller in the window, similarly to the wall sections illustrated in FIG. 11. If desired, the inclination of the central wall sections may be reversed to accord with the wall sections of FIG. 9.

FIGS. 1 through 8 illustrate practical embodiments of my improved cage and typical uses thereof.

Figure 2:
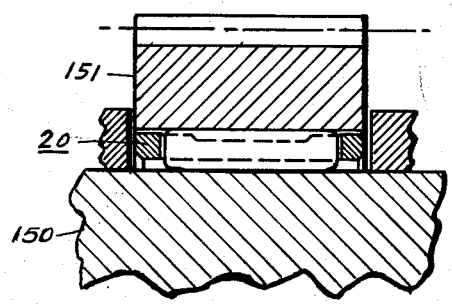
FIG. 2 is a partial cross-sectional view of an application of the cage of FIG. 1 illustrated with a shaft and a gear.

A self contained cage 20 may be placed between a shaft 150 and a transmission gear 151, FIG. 2, or other component which is generally hardened and ground. A cage 120 having two rollers 121, 122 per window, illustrated in FIG. 3, may be used in similar manner. Likewise, the cage 220 (FIG. 5) having two or more rows of coaxial or staggered windows with a spacing rib 221 therebetween is suitable for such use.

For grooved shafts (FIG. 8) or bearing supported crankshafts or other places where a single piece cage cannot be used, I can split my improved cage 320 through diametrically opposite cross bars 321 to permit fitted encirclement of the shaft 322 in the groove 325. Each half 323, 324 of the split cage is completely self contained. The split planes may have meshing engagement, as shown in FIG. 7, for locking the two halves axially or the split planes may be straight and smooth.

While I have described and illustrated specific embodiments of my self contained cage, it is to be understood that other modifications may be made using my sectionalized wall principle within the scope of the invention.

Having described my invention, I claim:

1. A cage for retaining cylindrical rollers comprising limiting end walls and crossbars defining completely sectionalized side walls defining spaced, axially parallel windows for retaining the rollers, each of said side walls having at least two inclined wall sections extending throughout the depth of said crossbars which with respect to the entire opposed wall sections radially converge and diverge alternately along the lengths of said windows, each pair of opposed wall sections having their convergent ends spaced apart a distance less than the diameter of a roller so as to prevent the free passage of a roller therebetween and having their divergent ends spaced apart a distance greater than the diameter of a roller, said crossbars further defining inner and outer annular surfaces, said wall sections lying entirely within the inner and outer annular surfaces.

2. A cage according to claim 1 wherein the angle of inclination of a side wall section on one side of said window is substantially parallel to a non-opposed side wall section on the other side of said window.

3. A cage according to claim 1 wherein at least one side wall of each window has at least three wall sections.

4. A cage according to claim 1 wherein said wall sections are yieldable to permit the passage of the rollers under pressure through the convergent ends of said side wall sections.

5. A one piece cage for cylindrical rollers comprising circumferential rims connected by crossbars forming roller windows, each of said crossbars defining side walls forming the depth of said windows, said side walls being divided into at least two wall sections inclined with respect to each other throughout the depth of the window and with respect to at least one of the sections on the opposed side wall and to a radial plane extending between said side walls so that collectively the side walls of each window will allow the passage of rollers into or out of said windows only under pressure.

6. A cage for retaining bearing rollers comprising opposed substantially flat walls forming spaced, axially parallel windows for receiving rollers, said walls of each of said windows being subdivided to form at least two pockets, each of said pockets housing a portion only of a roller and restricting the radial movement of a roller in one direction, said cage being further defined by inner and outer annular surfaces, the walls forming each pocket extending uniformly from one annular surface of the cage to the other, the combination of pockets in a window restricting movement of a roller out of said window in both radial directions.

7. A cage for retaining bearing rollers comprising opposed walls forming spaced, axially parallel roller retaining windows, each of said walls including side wall sections forming pockets, the opposed side wall sections of each pocket being parallel to each other but inclined with respect to the side wall sections of the adjacent pockets and forming peripheral window pockets restricting movement of a roller out of a window in both a radially outward direction and a radially inward direction.

8. In combination, a one piece cage, rollers for said one piece cage, said one piece cage comprising circumferential end rims connected by crossbars and forming roller retaining windows, said crossbars defining two side walls for each window one of which is flat and substantially rectangular, the other side wall of each window having at least two wall sections which are inclined to each other and to a diametrical plane extending between said side walls, said one piece cage having an outer surface defining an outer annulus and also having an inner annular surface defining an inner annulus the distance between the peripheral edge of one wall section and the opposed side wall along the outer cage annulus being less than the diameter of a roller to restrict the movement of said roller into and out of the window in one radial direction, and the distance between the peripheral edge of the wall section adjacent the first named section and the opposed side wall along the inner cage annulus being less than the diameter of a roller to restrict the movement of said roller into and out of the window in the direction opposite to the first named radial direction.

9. In combination, rollers, a self contained cage for housing and retaining said rollers comprising end walls and side walls forming a plurality of bar spaced parallel roller receiving windows, said self contained cage including inner and outer annular surfaces, said side walls being divided into sections to divide said windows into roller housing pockets with said side wall sections being flat but inclined and extending substantially completely between said inner and outer annular surfaces, and said side wall sections collectively restricting the movement of said rollers into and out said windows.

10. A cage according to claim 9 wherein the cage is divisible into two or more self contained sections.

11. A cage according to claim 9 wherein each window houses and retains at least two rollers.

12. A cage according to claim 9 wherein rows of windows are axially spaced.

References Cited in the file of this patent

UNITED STATES PATENTS

| | | |
|---|---|---|
| 1,563,487 | Herb | Dec. 1, 1925 |
| 1,966,775 | Weis | July 17, 1934 |
| 2,044,663 | Brodin | June 16, 1936 |
| 2,607,640 | Bergman | Aug. 19, 1952 |
| 2,696,411 | Kircher | Dec. 7, 1954 |

FOREIGN PATENTS

| | | |
|---|---|---|
| 1,036,569 | Germany | Aug. 14, 1958 |
| 1,062,069 | Germany | July 23, 1959 |
| 1,099,809 | Germany | Feb. 16, 1961 |
| 1.238.139 | France | June 27, 1960 |